(12) United States Patent
Biddell et al.

(10) Patent No.: US 6,359,226 B1
(45) Date of Patent: Mar. 19, 2002

(54) DEVICE AND METHOD FOR PROTECTING AND SEALING EXPOSED WIRES (75) Inventors: William Biddell, Hayward; Daniel A. Chandler, Menlo Park; Erling Hansen, Palo Alto, all of CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/063,935

(22) Filed: Apr. 21, 1998

(51) Int. Cl.⁷ .............................................. H02G 15/02
(52) U.S. Cl. ...................................... 174/74 A
(58) Field of Search ................. 174/43, 74 A, 174/75 F, 83, 94 R, 84 R (56) References Cited

U.S. PATENT DOCUMENTS

| | | | |
|---|---|---|---|
| 2,264,480 A | * 12/1941 | Owen | 294/93 |
| 2,870,239 A | * 1/1959 | Ustin | 174/87 |
| 2,932,685 A | * 4/1960 | Raila et al. | 174/84 |
| 3,019,284 A | * 1/1962 | Matthysse | 174/84 |
| 3,585,275 A | * 6/1971 | Gillemot | 174/76 |
| 3,596,231 A | * 7/1971 | Melton | 339/96 |
| 3,806,630 A | * 4/1974 | Thompson et al. | 174/72 R |
| 3,984,912 A | 10/1976 | Johnston et al. | 29/628 |
| 4,194,082 A | * 3/1980 | Campbell | 174/74 |
| 4,460,820 A | 7/1984 | Matsumoto et al. | 219/385 |
| 4,526,732 A | 7/1985 | Kakii et al. | 264/2.7 |
| 4,528,419 A | 7/1985 | Charlebois et al. | 174/88 R |
| 4,595,724 A | * 6/1986 | Koblitz | 524/409 |
| 4,717,608 A | * 1/1988 | Meltsch | 428/35 |
| 4,751,350 A | * 6/1988 | Eaton | 174/87 |
| 4,764,662 A | 8/1988 | Andersen et al. | 219/391 |
| 4,769,513 A | * 9/1988 | Ragland et al. | 174/23 R |
| 4,849,580 A | 7/1989 | Reuter | 174/92 |
| 4,863,535 A | 9/1989 | More | 156/49 |
| 4,877,943 A | * 10/1989 | Oiwa | 219/538 |
| 4,963,700 A | 10/1990 | Olsen et al. | 174/138 F |
| 4,972,042 A | 11/1990 | Seabourne et al. | 174/23 R |
| 5,221,815 A | 6/1993 | Bostock et al. | 74/84 R |
| 5,245,151 A | 9/1993 | Chamberlain et al. | 219/10.57 |
| 5,271,975 A | * 12/1993 | Solano | 428/34.9 |
| 5,335,408 A | * 8/1994 | Cobb | 29/447 |
| 5,378,855 A | 1/1995 | Delalle | 174/87 |
| 5,439,031 A | * 8/1995 | Steele et al. | 138/89 |
| 5,441,560 A | 8/1995 | Chiotis et al. | 106/18.12 |
| 5,490,785 A | 2/1996 | Hein et al. | 439/76.1 |
| 5,589,666 A | * 12/1996 | DeCarlo et al. | 174/87 |
| 5,622,642 A | * 4/1997 | Edwards et al. | 219/542 |
| 5,641,943 A | * 6/1997 | Sawamura | 174/74 A |
| 5,753,861 A | * 5/1998 | Hansen et al. | 174/93 |
| 5,767,448 A | * 6/1998 | Dong | 174/74 A |
| 5,844,170 A | * 12/1998 | Chor et al. | 174/74 A |

FOREIGN PATENT DOCUMENTS

DE 37 25 124 A 2/1989

OTHER PUBLICATIONS

International Search Report for International Application No. PCT/US98/08458 dated Aug. 20, 1999.

* cited by examiner

Primary Examiner—Dean A. Reichard
Assistant Examiner—William H. Mayo, III (57) ABSTRACT Applicants have created an improved device and method for protecting from the elements wires which have a portion of their electrically insulative covering stripped off, such as spliced wires, and particularly stub-spliced wires. The device comprises (a) a dimensionally-recoverable tubing, (b) a layer of sealant (which preferably also acts as an adhesive) applied to at least a portion of the interior surface of the tubing, and (c) a cap or sheath into which at least a portion of the exposed wires are inserted, wherein at least a portion of the cap or sheath is positioned interior to the dimensionally-recoverable tubing. The cap or sheath includes a configured interior shape for holding the inserted wires, and is designed to permit the adhesive/sealant to flow around the inserted wires. The cap or sheath typically forms a closure at one end of the dimensionally-recoverable tubing or is positioned at or adjacent to a closure end of the tubing. At least the exterior, and preferably all of the cap or sheath is made of non-conductive material.

31 Claims, 4 Drawing Sheets

DEVICE AND METHOD FOR PROTECTING AND SEALING EXPOSED WIRES

BACKGROUND OF THE INVENTION

1. Field of the Invention

The present invention pertains to a device and method for protecting and sealing exposed wires, particularly wires which make up electrical harnesses used in automobile engines.

2. Brief Description of the Background Art

Dimensionally-recoverable tubing is commonly used to protect spliced wires within electrical harnesses in the automobile industry. One of the preferred splice configurations is a "stub splice". In a stub splice, each wire to be spliced has its electrically insulative covering removed at one end, to expose bare electrically conductive wire, with all of the bare wires to be spliced arranged to run in the same direction. The exposed bare wires are essentially parallel to each other at one end of the configuration. The bare wires are then crimped, welded or soldered together to form a "nugget". Subsequently, the nugget must be protected and sealed from the external environment. A preferred means for protecting the nugget and sealing out moisture and other contaminants is to encase the nugget in a dimensionally-recoverable tubing which has a sealant/adhesive coating interior to the tubing. Typically, heat is applied to cause the sealant/adhesive to flow, while simultaneously causing the tubing to heat-recover (shrink) about the nugget. The tubing shrinks around the end of the exposed wires and the adhesive/sealant flows within the tubing to cover the exposed wires. The adhesive/sealant also flows along the wires to contact and cover a portion of the unstripped, electrically insulative wire covering. This provides a seal over the entire length of the exposed wires up to and including the beginning of the insulative wire covering.

However, during installation, the adhesive/sealant used in combination with the dimensionally-recoverable tubing tends to act as a lubricant, causing the tubing to slide or back off of the inserted wires. Typically, the tubing does not completely slide off the wires, but this may happen on occasion. This phenomenon is known as "milk-off". When milk-off results in a substantial back off of the tubing from the inserted wires, (for example, the tubing has backed off of the inserted wires by more than about one third of the recoverable tubing length), the stub splice may not be sealed properly, and moisture can reach the exposed wires, causing a short. Further, if the adhesive/sealant available for sealing becomes significantly reduced in quantity due to leakage from the closure end of the tubing or due to being left on wires which are no longer enclosed by the tubing as a result of milk off, there may be inadequate adhesive/sealant to protect the exposed portion of the wires enclosed by the tubing.

A short may also occur if a strand of wire which is part of the nugget is bent up and pokes through the wall of the heat-shrinkable tubing while it is being recovered (at this time the tubing is hot and softened).

As is readily apparent, an electrical short within the wiring harness of the engine compartment of an automobile or other motor vehicle is not only inconvenient when the vehicle stalls, but may be dangerous to the driver and passengers of the vehicle.

The prior art contains a number of devices which have been designed to provide protection of electrical wiring splices from the elements, and in particular from moisture penetration, which tends to be one of the worst problems. Some examples of these prior art devices are described below. U.S. Pat. No. 3,984,912, issued Oct. 12, 1976 to Johnston et al., discloses a method for splicing cable in which electrical wire conductors which project from two insulated cable end portions are received in tubular electrical connectors which have been electrostatically precoated with electrical insulating material. Each precoated connector end portion respectively abuts and is sealed in engagement with insulation on an associated cable end portion. The precoated connectors are crimped so that they grip the wire conductors to form a basic electrical splice. A tubular inner melt liner and a tubular outer sleeve of thermoplastic electrical insulating material surround the basic splice. Heat is applied to simultaneously melt the inner liner and shrink the outer sleeve to encapsulate the basic splice.

U.S. Pat. No. 4,528,419, issued Jul. 9, 1985 to Charlebois et al., discloses a method of forming an encapsulated splice region between two cable ends. After end portions of the core have been exposed beyond the jacket and sheath or shield, the conductors are splayed outwards and the cable end portions are brought close together. Splices are then formed between conductors of the two cables and the conductors are folded over either one cable jacket or the other to locate each splice upon and supported by the jacket.

Each splice is individually covered with sealing material, and end regions of the cables are encapsulated so as to encapsulate the splices and to seal them so that they are fluid-tight. Heat is provided during the encapsulation of the splices in order to soften the sealing material so that it will completely surround each splice.

U.S. Pat. No. 4,849,580, issued Jul. 18, 1989 to Reuter et al., discloses a closure/sealant combination for use in providing an "environmental seal" around a wire junction or splice. The preferred embodiment of the closure has a unitary construction comprising an outer, openable shell having an internal biasing mechanism. Viscous sealant material is positioned within the closure such that the biasing mechanism forces sealant material around a junction to be sealed and, in particular, between adjacent wires in such junctions.

U.S. Pat. No. 4,863,535, issued Sep. 5, 1989 to More, discloses a method and arrangement for generating an environmental seal around a connection such as an electrical junction. The arrangement comprises a pad arrangement which is in association with a substrate and a sealant pad. The sealant pad comprises a highly viscous sealant which, under pressure, can be forced into areas between adjacent wires to provide effective moisture seals. According to a preferred method of the invention, a substrate having sealant on it is folded around a junction to be sealed, such that the substrate retains the sealant against the electrical junction. Pressure is applied to the enclosed sealant pad, generating hydraulic forces in such a manner as to direct the sealant against the electrical junction.

U.S. Pat. No. 4,963,700, issued Oct. 16, 1990, to Olsen et al., discloses a closure for providing an environmental seal about a wire junction. The closure comprises a closable shell defining, when closed, an internal wire junction receiving chamber having first and second opposite open ends for receiving wires. The shell comprises first and second shell sections, and an interference fit locking arrangement is oriented between the shell sections. The shell sections may be unitary (ie., joined along a hinge line), or they may be independent of one another, but engageable in a nesting manner. The interference locking mechanism preferably comprises a plurality of elongate, continuous, interengageable ratchet teeth. In use, sealant material is positioned within the shell sections, and a junction to be sealed is placed within the shell.

U.S. Pat. No. 4,974,042, issued Nov. 20, 1990, to Seabourne et al., and assigned to the assignee of the present invention, discloses a blocking arrangement for suppressing fluid transmission in cables, particularly for use in harnesses for automotive applications. The arrangement comprises a generally flat blocking array that is formed from a fusible polymeric sealant (e.g., a hot-melt adhesive or a thermosetting adhesive). The blocking array has a number of passageways for receiving wires of the cable. The passageways extend from one end of the array to the other. The assembly includes a heat-shrinkable covering that can be positioned around the blocking array in its flat configuration and recovered about the array by application of heat. The sealant is capable of melting during recovery of the covering and being forced from a generally flat configuration to a generally cylindrical one by recovery of the covering.

U.S. Pat. No. 5,221,885, issued Jun. 22, 1993 to Bostock et al., and assigned to the assignee of the present invention, discloses a device and method for forming a solder connection between a plurality of electrical conductors. The device comprises a hollow, dimensionally heat-recoverable sleeve that contains a quantity of solder. The sleeve has at least one open end to allow insertion of one or more electrical conductors. A deformable retaining member is located within the sleeve. The retaining member is mechanically deformable to retain the conductors in the desired alignment within the sleeve, and is deformable while in contact with the conductors.

U.S. Pat. No. 5,378,855, issued Jan. 3, 1995 to Delalle, and assigned to an international subsidiary of the assignee of the present invention, discloses a device for forming an electrical connection at the end of a bundle of wires. The device comprises an electrically insulating, preferably heatshrinkable, sleeve; a metallic connecting element located within the sleeve; and a quantity of solder for forming a permanent electrical connection between the conductors. The connecting element has a tapering internal surface which has a screw thread, so that a temporary electrical connection can be formed by screwing the bundle of wires into the connecting element. Preferably, the connecting element is formed by winding a wire into a frustoconical form. Wire bundles may be spliced using a device in which the connecting element has a pair of internally threaded portions into which different cable bundles can be screwed.

U.S. Pat. No. 5,441,560, issued Aug. 15, 1995 to Chiotis et al., discloses a crimp splicer comprising a connector, an insulating sleeve, and a gel or encapsulant. The connector is preferably cylindrical or barrel-shaped and consists of a ductile metal which is a good conductor or capable of being deformed with a crimping device. The insulating sleeve is generally cylindrically shaped and has a bore formed therein which runs the length of the sleeve. The sleeve is shaped and sized to enable mechanical retention of the connector disposed within the bore of the sleeve. Suitable materials for the sleeve include nylon and polyvinylidene fluoride, since the necessary crimping force can be applied through these materials without damage to the insulating sleeve or loss of retention of the connector. The gel is an organopolysiloxane gel composition.

As can be observed by looking through the patents described above, the various devices proposed are relatively complex and expensive to manufacture. In some cases, where the device requires crimping, application of too much or too little pressure may result in a device which does not function properly.

The stub splice which was described above, protected by dimensionally-recoverable tubing with an interior adhesive/sealant provides for ease of application, harness manufacturing simplicity, and is relatively inexpensive when compared to other devices. Thus, if the reliability problems which may arise due to milk-off and poke-through of wire strands could be eliminated, this splice configuration would be highly advantageous.

SUMMARY OF THE INVENTION

Applicants have created an improved device and method for protecting from the elements wires which have a portion of their electrically insulative covering stripped off, such as spliced wires, and particularly stub-spliced wires. The improved device prevents the milk-off and wire poke-through previously described, while simultaneously reducing the possibility that (due to loss of adhesive/sealant during application of the device) there will be inadequate adhesive/sealant to provide a proper seal.

Accordingly, disclosed herein is a device for protecting and sealing wires having an exposed portion where an electrically insulating covering is stripped off. The device comprises (a) a dimensionally-recoverable tubing, (b) a layer of sealant (which preferably also acts as an adhesive) applied to at least a portion of the interior surface of the tubing, and (c) a cap or sheath into which at least a portion of the exposed wires are inserted, wherein at least a portion of the cap or sheath is positioned interior to the dimensionally-recoverable tubing. The cap or sheath includes a configured interior shape for holding the inserted wires, and is designed to permit the adhesive/sealant to flow around the inserted wires. The cap or sheath typically forms a closure at one end of the dimensionally-recoverable tubing or is positioned at or adjacent to a closure end of the tubing. At least the exterior, and preferably all of the cap or sheath is made of non-conductive material. The device can be used to protect and seal exposed wires in bundles, such as the nuggets of a stub splice, of varying diameters, depending on the design of the configured interior shape of the cap or sheath.

Also disclosed herein are several embodiments representative of the kind of a cap or sheath which is useful as part of the device described above. The critical elements of the cap or sheath are that it include a configured shape for holding the wires; that the configured shape permit a sealant/adhesive to reach the exposed portion of the wires and the juncture of the exposed portion with the portion having the electrically insulative covering, in a manner which is sufficient to provide a moisture-resistant sealing of the wires; and that the cap or sheath be constructed of a material which prevents wire poke through during the recovery of the dimensionally-recoverable tubing.

A portion of the cap may act as the closure end of the device, having a shape which is easily grasped by automated handling equipment, with a configured shape for holding the wires extending from the cap portion which acts as the closure end.

The configured shape may be in the form of fins which are positioned longitudinally along the length of the cap or sheath and which extend radially toward the interior of the cap or sheath. The fins may be positioned longitudinally along the length and extending at an angle to the radius and toward the interior of the cap or sheath. The configured shape may include directional arms or barbs which, after the wires have been inserted, make it difficult to remove the wires from the cap or sheath. The configured shape may be in the form of an internal coil or spiral located within the cap or sheath, wherein the coil extends along the longitudinal direction of the cap or sheath. Preferably, the opening dimension inside the coil decreases from the entry to the cap or sheath toward the end of the cap or sheath nearest the closure end of the protective device. Preferably, the fins, arms, coil, or other configured shape is injection molded or extruded as an integral part of the cap or sheath.

Also disclosed herein is a method for protecting and sealing exposed wires, wherein the method involves the use of the protective device described above. The first step of the method comprises inserting wires, a portion of which are exposed (do not have an electrically insulating covering thereon) into the protective device a sufficient distance so that a configured shape within the device can grasp and hold the ends of the exposed wires inserted therein, wherein the protective device comprises (a) a dimensionally-recoverable tubing, (b) a layer of sealant (which preferably acts as an adhesive) applied to at least a portion of the interior surface of the tubing, and (c) a cap or sheath into which at least a portion of the exposed wires are inserted, wherein at least a portion of the cap or sheath is positioned interior to the dimensionally-recoverable tubing, and wherein the cap or sheath includes a configured interior shape for holding the inserted wires, which shape is designed to permit the adhesive/sealant to flow around the inserted wires.

The second step of the method involves treating the device in a manner which causes the dimensionally-recoverable tubing to recover. Preferably, the dimensionally-recoverable tubing is heat-recoverable tubing, and the tubing is exposed to a temperature sufficient to shrink or to recover the tubing and to cause the adhesive/sealant to flow within the tubing. The adhesive/sealant has a viscosity ranging from about 100 poise to about 10,000 poise, and preferably from about 500 poise to about 5,000 poise, at the time it flows within the tubing. Further, the cap or sheath must maintain sufficient strength at the heat-recovery temperature to prevent wire poke-through from the exposed wires held by the cap or sheath.

BRIEF DESCRIPTION OF THE DRAWINGS

FIG. 4A shows an embodiment in which the configured internal shape comprises internal fins which are positioned along the longitudinal direction of the cap or sheath and extend radially for a distance toward the center of the cap or sheath, leaving an opening along the longitudinal center-line of the cap or sheath. FIG. 4B shows an embodiment in which internal fins are positioned along the longitudinal direction of the cap or sheath, but at an angle a from the radius. FIG. 4C shows an embodiment in which the cap or sheath includes an internal coil which extends along the longitudinal direction of the cap or sheath. Preferably, the opening dimension inside the coil decreases from the entry to the cap or sheath toward the end of the cap or sheath nearest the closure end of the tubing in which the cap or sheath sits. Preferably, the coil is injection-molded as an integral part of the cap or sheath.

DETAILED DESCRIPTION OF THE INVENTION

The present invention pertains to a device and method for protecting and sealing wires, a portion of which are exposed, against the elements. The device is particularly useful for protecting and sealing stub spliced wires which are frequently present in automobile electrical harnesses. Applicants have created a device which comprises a dimensionally-recoverable tubing having an adhesive/sealant applied to at least a portion of its interior surface, and having a cap or sheath, at least a portion of which is positioned interior to the tubing. The cap or sheath includes a configured shape which holds wires which are inserted therein in place during recovery of the tubing about the wires. The configured shape permits flow of the adhesive/sealant around the exposed wires and around the juncture where an electrically insulative covering begins to cover the wires. The portion of the cap or sheath which holds the wires also prevents the wires from poking through a softened tubing during recovery of the tubing.

I. DEFINITIONS

As a preface to the detailed description, it should be noted that, as used in this specification and the appended claims, the singular forms 'a', 'an', and 'the' include plural referents, unless the context clearly dictates otherwise. For example, "a wire" or "a wire bundle" refers to one or more wires or wire bundles.

Specific terminology of particular importance to the description of the present invention is defined below.

The term "cap" refers to a structure having two opposing ends, wherein one end is closed and the other end is open.

The term "dimensionally-recoverable" has the meaning usually inferred in the industry, where a dimensionally-recoverable article is one whose dimensional configuration may be made to change substantially when subjected to a treatment. Usually these articles recover towards an original shape from which they have previously been deformed, but the term "recoverable" as used herein also includes an article which adopts a new configuration, even if not previously deformed. A typical form of dimensionally-recoverable article is a heat-recoverable article, whose dimensional configuration may be changed by subjecting the article to heat treatment. In their most common form, heat-recoverable articles comprise a shrinkable sleeve made from a polymeric material.

The term "heat-recoverable" refers to any material which changes in configuration upon heating.

The term "heat-shrinkable" refers to any material which diminished in size upon heating.

The term "sheath" refers to a structure having two opposing ends, wherein both ends are open.

II DEVICE FOR PROTECTING EXPOSED WIRES

Figure 1:
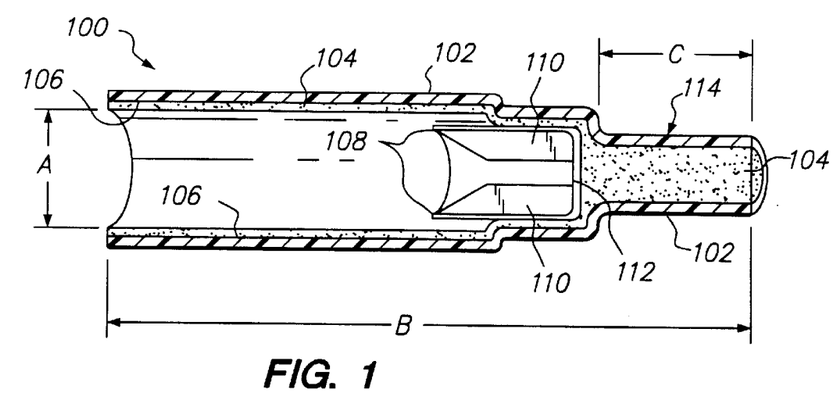
FIG. 1 shows a schematic of a cross-sectional side view of a first embodiment device of the invention including a cap.

FIG. 1 shows a schematic of a cross-sectional side view of a preferred embodiment device 100 of the invention, including a cap 108. The device 100 comprises the following general components: (a) dimensionally-recoverable tubing 102; (b) a layer 104 of sealant coating the inner surface 106 of the tubing 102; and (c) a cap 108 positioned in one end of the tubing 102. The cap 108 can be slidably inserted into one end of the tubing 102, with the tubing subsequently recovered at that end only to provide the configuration shown in FIG. 1, where the cap 108 is held in place by the recovered tubing and by the presence of the adhesive/sealant material 104 in contact with the cap and the tubing.

Figure 2:
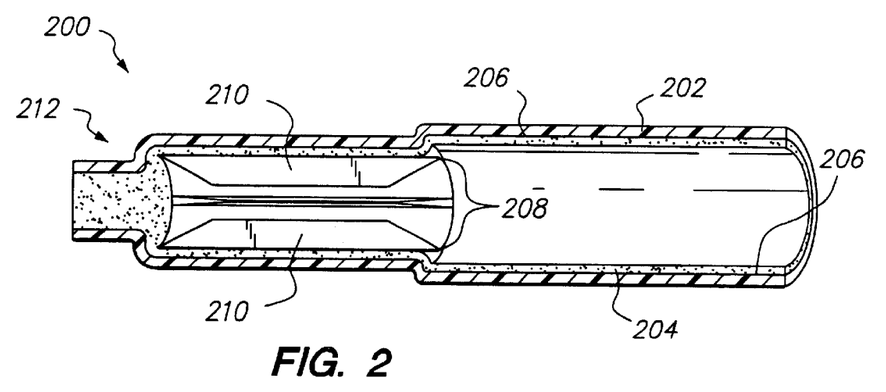
FIG. 2 shows a schematic of a cross-sectional side view of a second embodiment device of the invention including a sheath.

FIG. 2 shows a schematic of a cross-sectional side view of another embodiment of the invention, where the device 200 includes a sheath 208. The cap 108 shown in FIG. 1 is more preferred than the sheath 208 shown in FIG. 2, because the end 112 of the cap 108 helps prevent the possibility of moisture entering the spliced area from the closure end 114 of the tubing. The device 200 comprises the following general components: (a) dimensionally-recoverable tubing 202; (b) a layer 204 of sealant coating the inner surface 206 of the tubing 202; and (c) a sheath 208 into which exposed, non-insulated wires are inserted. The sheath 208 is positioned at a location near the closure end 212 of the tubing 202. The sheath 208 can be slidably inserted into the tubing 202, with the tubing subsequently recovered at that end only of the tubing, to provide the configuration shown in FIG. 2, where the cap is held in place by the recovered tubing and adhesive/sealant in the area of the cap.

The dimensionally-recoverable tubing preferably comprises a suitable heat-shrinkable or heat-recoverable material. The heat-recoverable tubing material is selected from materials which meet the end-use requirements for the wiring application and materials which can withstand the conditions to which the adhesive/sealant must be exposed to cause it to flow and encapsulate the wire surfaces to be protected. For an automobile harness application, where the wiring is to be present in an engine compartment, the typical requirement is a continuous operational temperature of about 125° C. We have determined that the adhesive/sealant works particularly well when the viscosity ranges from about 500 poise to about 5,000 poise at the time the sealant/adhesive flows around the wires. However, an adhesive/sealant having a viscosity ranging from about 100 poise to about 10,000 poise may be used, depending on the application. The tubing material and adhesive/sealant must work in cooperation over a temperature range which provides the required adhesive/sealant viscosity while providing the required recovery of the tubing around the cap or sheath and the wires inserted therein. Not by way of limitation, but by way of example, the dimensionally-recoverable tubing may comprise a heat-recoverable polymeric material having a heat-recovery temperature within the range of about 90° C. to about 180° C.

Preferred tubing materials for use in the invention include, but are not limited to, low-density polyethylene (LDPE); high-density polyethylene (HDPE); polyvinylidene fluoride (PVDF); polyamines such as Nylon type 612, Nylon type 11, and Nylon type 12; polycarbonate; and block copolymers of styrene with butadiene or isoprene.

A layer of sealant, preferably adhesive/sealant, is applied to the inner surface of the tubing. The sealant is designed to flow at the tubing heat-recovery temperature, and to flow around the individual wires within the tubing, surrounding the exposed wires and extending past the juncture at which the insulating covering of each exposed wire begins. The purpose of the sealant is to prevent moisture from traveling along the insulated wire portions to reach the exposed wire and to prevent moisture from entering the closure end of the tubing. As previously mentioned, the adhesive/sealant should have a viscosity ranging from about 500 poise to about 5,000 poise. This viscosity is high enough that the adhesive/sealant will not tend to run out of the heat-recoverable tube easily during recovery of the tube. This viscosity is low enough to permit wire encapsulation. Preferably the adhesive/sealant is a thermoplastic material which can be co-extruded with the tubing. Examples of thermoplastic materials which are capable of providing such viscosities, which resist moisture absorption, and which provide the required viscosities over the temperature range compatible with the recovery of typical heat-recoverable tubings follow. These examples include (but are not limited to) polybutylene, polyethylene-methylacrylate, polystyrene, acrylobutadiene-styrenes, and polyamide-polyolefin-based compounds.

Solvent carried adhesives can be applied to the interior of the tubing. In the alternative, a low temperature adhesive/sealant which is fluid at ambient pressure and at about 100° C. can be pumped through the tubing, followed by pumping of a gas through the tubing, to leave a coating of the adhesive/sealant on the walls of the tubing.

As previously mentioned, when a cap is used rather than a sheath to prevent milk-off and wire poke-through, the danger of moisture entering from the closure end of the tubing is reduced.

Preferably, the sealant also functions as an adhesive for the tubing interior surface, the exposed wires, the insulated covering on the wires, and the cap or sheath material, so that an integral structure is formed upon heat-recovery of the device tubing and flow of the sealant around a stub splice, for example. The amount of sealant required depends on the volume space to be filled by the sealant. One skilled in the art can calculate this volume, depending on the application, and knowing this and the interior circumference of the tubing, can calculate the thickness of a sealant layer which must be applied to the interior of the dimensionally-recoverable tubing. Typical examples of sealant thickness are provided subsequently, as related to specific embodiment examples of the device of the present invention.

A particularly preferred material for use in fabrication of the protective device of the present invention is adhesive-lined Thermofit ® ES-2000 heat-shrinkable tubing available from Raychem Corporation of Menlo Park, Calif. The heat-shrinkable tubing is a flame-retarded, high density polyethylene (HDPE) tubing and the adhesive is a thermoplastic polyamide-polyolefin-based sealant/adhesive.

The inner diameter of the dimensionally-recoverable tubing depends upon the application. For a typical automotive harness application, the inner diameter preferably ranges from about 0.70 inches to about 0.05 inches. The walls of the tubing preferably have a thickness within the range of between about 0.05 inches to about 0.01 inches.

The exterior of the cap or sheath must be made of a non-conductive material, which preferably has a softening temperature that is higher than the recovery temperature of the tubing material. The non-conductive material may have a softening temperature which is just slightly lower than the recovery temperature of the tubing material, so that the non-conductive material will deform upon recovery of the tubing material. When the recovery temperature of the tubing ranges from about 90° C. to about 180° C., the softening temperature of the cap or sheath exterior material will typically range from about 150° C. to about 240° C., respectively. The preferred material must maintain sufficient strength over this temperature range to prevent wire poke-through.

Preferred non-conductive materials which function over the temperature range given above include, but are not limited to: polyether/amide block polymers, polycarbonate-polyester copolymers, propylene, acetal homopolymer and copolymers, fluoroplastics, polyamides such as Nylon 8, Nylon 11, Nylon 12, Nylon 66 and Nylon 612.

The cap or sheath includes a configured shape for holding exposed ends of wires which are inserted into the device of the invention. Preferably, these configured shapes are formed from the same non-conductive material as the exterior of the cap or sheath and are formed as an integral part of the cap or sheath using a technique such as injection molding or extrusion. However, the configured shape could be a conductive material if the end use application would be better served by the use of such a conductive material.

Figure 3:
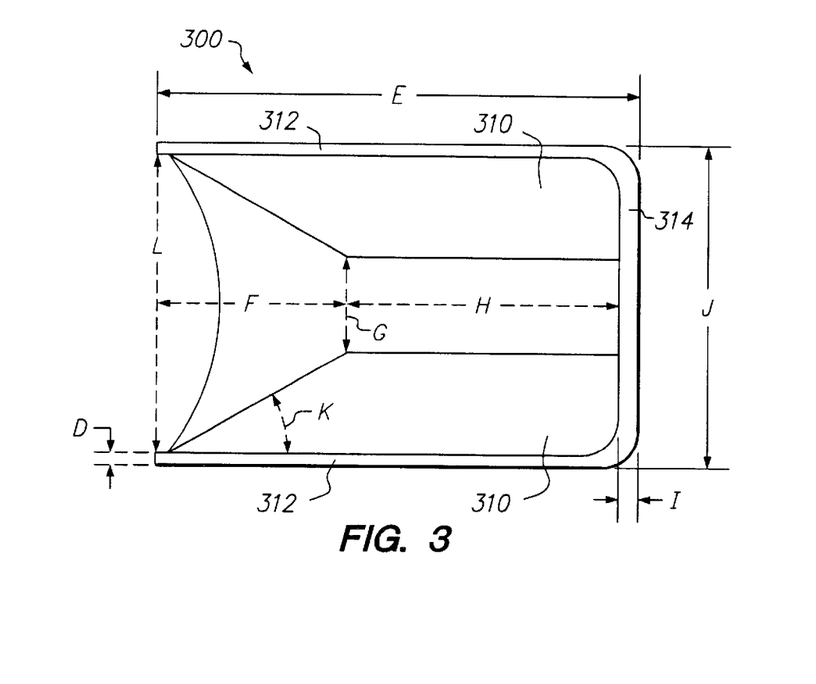
FIG. 3 shows a schematic of an enlarged cross-sectional side view of a preferred embodiment cap of the invention.

The configured shape can be, for example, fins (110, 210) that are radially arranged within the interior of the cap 108 or sheath 208, as illustrated in FIGS. 1 and 2. A schematic of an expanded cross-sectional side view of a preferred embodiment cap 300 having fins 310 is shown in FIG. 3. The sides 312 of the cap prevent wire poke-through, the fins 310 prevent milk-off, and the closed end 314 prevents leakage of moisture into the interior of cap 300. The broken lines in FIG. 3 are reference lines indicating various dimensions of the cap, which will be discussed in detail subsequently, and are not features of the cap itself.

Figure 4A:
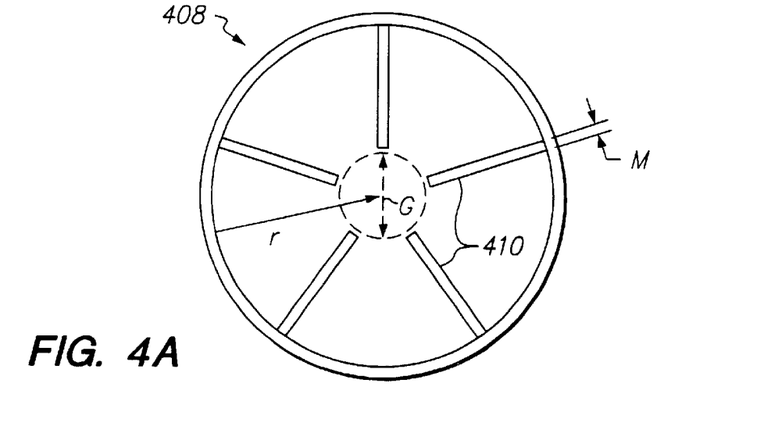
FIGS. 4A, 4B, and 4C show schematics of enlarged cross-sectional front views of particular embodiments of the cap or sheath of the invention.
Figure 4B:
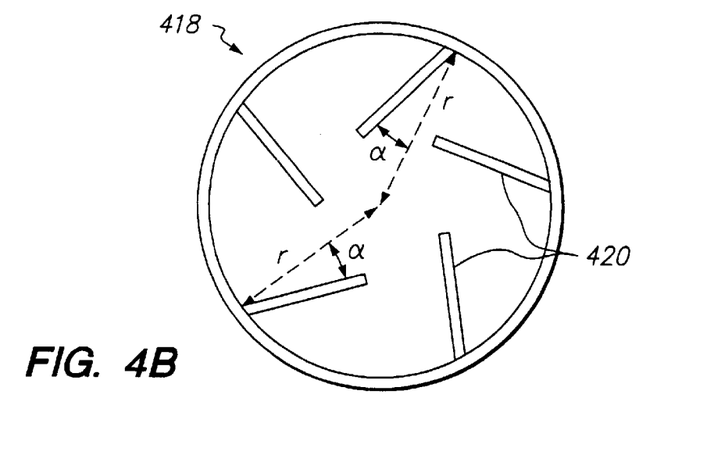

FIGS. 4A and 4B show schematics of front cross-sectional views of different embodiments of caps or sheaths having radially arranged fins. As shown in FIG. 4A, the radially arranged fins 410 can be positioned along the longitudinal length of the cap or sheath in a manner such that they extend radially toward the interior of the cap or sheath 408. Alternatively, as shown in FIG. 4B, the fins 420 can be positioned along the longitudinal length of the cap or sheath in a manner such that they extend at an angle, from radius r of cap or sheath 418. Preferably, the configured shape includes at least three fins.

Figure 4C:
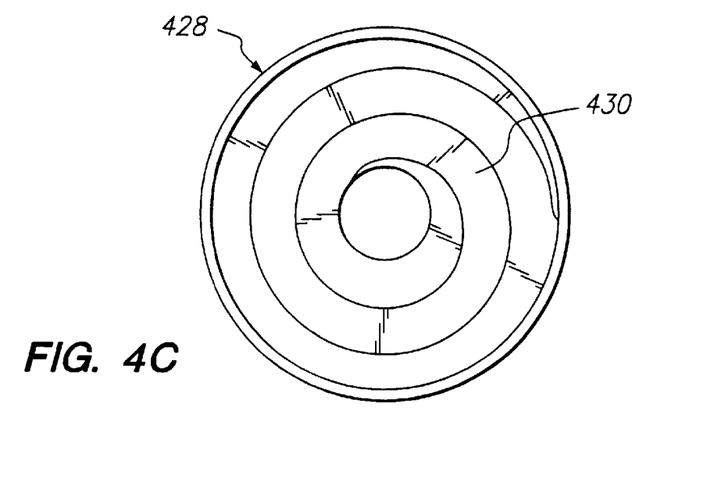

A schematic of a front cross-sectional view of a third embodiment of the cap or sheath is shown in FIG. 4C. This embodiment of the cap or sheath 428 includes an internal coil 430, which serves as the means for holding exposed ends of the wires. The internal coil 430 preferably comprises a non-conductive material, but may comprise a conductive material if this would be advantageous to the particular stub-splice exposed wire configuration. Preferred conductive materials include metals such as brass or steel, and metal-filled plastics such as metal-filled nylon or polycarbonate, by way of example and not by way of limitation.

The wire holding cap or sheath may have any exterior or interior shape as long as it is capable of holding the exposed wires in place. For example, the cap or sheath may be tapered along its longitudinal axis, so that the cap or sheath wire entry end is wider than the end which is adjacent the recoverable tubing closure location. As previously mentioned, the cap or sheath and the interior shape are typically injection molded as an integral unit. Less preferably, the configured shape is molded separately and is later inserted into the body of the cap or sheath.

Typical dimensions for the various components of a preferred embodiment device of the invention including a cap follow. These dimensions are with reference to FIGS. 1, 3, 4A, and 4B, and exemplary only, as one skilled in the art may vary the device dimensions to fit a given end use application. The dimension identification (per the figures) is presented first, followed by the value of the dimension in inches (with the exception of angles, which are in degrees). In particular, A=0.45; B=2.0; C<0.5; D=0.02; E=0.4; F=0.1; G=0.06; H=0.3; J=0.03; J=0.44; K=45°; L=0.43; M=0.008; and, =20°.

III. METHOD FOR PROTECTING EXPOSED WIRES

According to the method of the invention, the exposed ends of wires are inserted into a device such as that described above. Multiple wires are typically welded or soldered together to form a bundle, but may be twisted, simply bunched together, or inserted one by one into the device. Frequently, the ends of the bundled wires have been welded together to form what is known as a "nugget".

Figure 5:
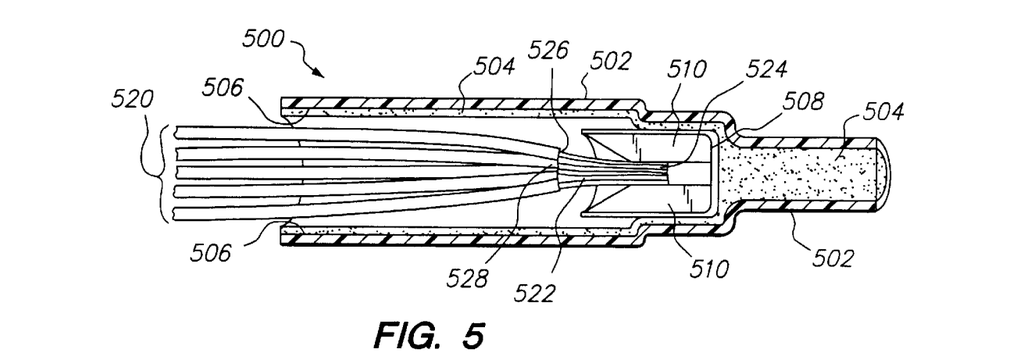
FIG. 5 shows a schematic of a cross-sectional side view of a stubspliced wire bundle inserted into the first embodiment device of the invention including a cap, prior to dimensional recovery of the tubing portion and flow of the sealant portion of the device.

FIG. 5 shows a schematic of a cross-sectional side view of a wire bundle 520 inserted into a preferred embodiment device 500 of the invention including a cap 508, prior to heating for purposes of sealant/adhesive 504 flow and heat-recovery of exterior tubing 502. The exposed portion 522 of wires 520 are inserted into the device 500 such that a fraction of the length of the exposed wire portion 522 is covered by the cap 508. The fraction typically ranges from approximately ½ to ¾ of the length of the exposed wire portion 522. This permits adhesive/sealant to encapsulate the exposed wires and the juncture 526 of exposed wires 520 with the electrically insulated portion 528 of the wires. Upon insertion, all of the exposed wire 522 is completely covered by the heat recoverable tubing 502.

In this example, a "nugget" 524 of exposed wires 522 is inserted directly into the cap 508. Because the cap 508 includes a configured shape (in this case, fins 510) for gripping the nugget, the outer diameter of the nugget 524 can be considerably smaller than the inner diameter of the cap 508, making it possible for a single device to be used to secure wire bundles of varying diameter. When the nugget 524 is inserted into the cap 508, the fins 510 should grip the nugget sufficiently tightly that the cap will not fall off the end if the wire bundle is inverted. If the cap is too loose and falls off the end of the wire bundle, a cap having a smaller inner diameter may be needed for use with that particular wire bundle.

The device 500 is then heated to a temperature sufficient to recover the tubing 502 and to cause the sealant 504 to flow, but below a temperature at which the cap 508 becomes too soft to prevent wire poke-through. For the kinds of materials previously described herein, the device is heated to a temperature such that the adhesive/sealant obtains the preferred 500 to 5,000 poise viscosity while the heat-recoverable tubing is simultaneously recovered.

Upon heating, the cap 508 may soften slightly and deform, but not melt, to conform to the shape of the wire nugget 524, while maintaining sufficient strength and rigidity to prevent wire poke-through in the event that any of the individual wires separated itself from the nugget. The sealant then melts and flows, and the device conforms to the shape of the wires 520, thereby sealing the wire nugget 524.

Heating of the device may be accomplished by any number of different means which are not harmful to the device or to the wire bundle. Radiant heating is one such preferred means. Hot air heating may be used as well. In a continuous process, typically, an infrared heater set point of about 500° C. to about 600° C. would be used with the device being passed by the heater on a conveyor. Apparatus for applying heat for the encapsulation of electrical wiring are well known in the art. For example, U.S. Pat. No. 4,764,662, issued Aug. 16, 1988 to Andersen et al., discloses an apparatus and process for insulating a splice with a heat-shrinkable tube. This kind of apparatus which may be useful when the method of the present invention is practiced on a continuous production line. A discreet processor, which processes individual spliced wire units may be used as well. For example, an apparatus which is particularly applicable to discreet processing of thermally shrinkable tubes is described in U.S. Pat. No. 4,526,732 of Kakii et al., issued Jul. 2, 1985. This apparatus uses a heating density gradient such that a higher temperature is imparted initially to a central portion of the heated tube, spreading gradually to the ends of the tube to purge air bubbles to the outside of the tube, while employing only one heating element. Another example of an apparatus useful in discreet processing of heat-shrinkable tubing is described in U.S. Pat. No. 4,460,820 of Matsumoto et al., issued Jul. 17, 1984. This apparatus has a base for supporting the heat-shrinkable tube and a plurality of heating units provided on the base. The heating units are independently operable and are disposed in the longitudinal direction of the heat shrinkable tube.

Figure 6:
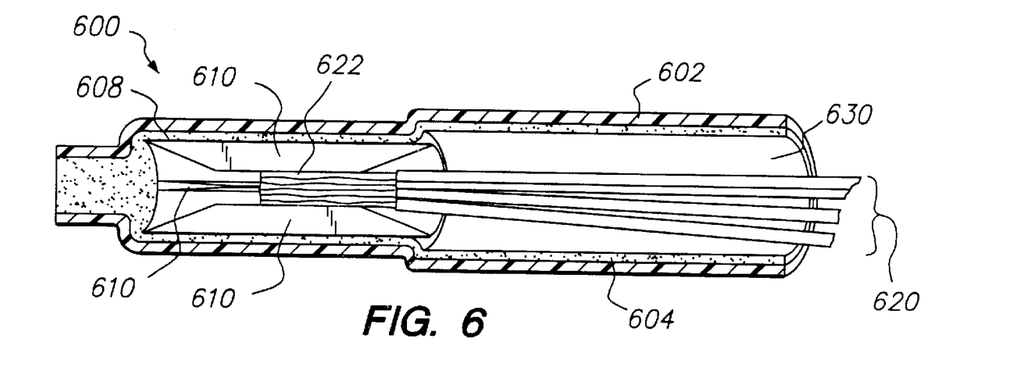
FIG. 6 shows a schematic of a cross-sectional side view of a stubspliced wire bundle inserted into the second embodiment device of the invention including a sheath, prior to dimensional recovery of the tubing portion and flow of the sealant portion of the device.

FIG. 6 shows a schematic of a cross-sectional side view of a wire bundle 620 inserted into the open end 630 of a preferred embodiment device 600 which includes a sheath 608, prior to heating. The exposed wires 622 of wire bundle 620 are inserted into the device 600 such that the exposed wire is completely covered by the heat-recoverable tubing 602. Preferably, upon insertion, all of the exposed ends 622 of wire bundle 620 are completely covered by the sheath 608.

When the exposed ends 622 of wire bundle 620 are inserted into the sheath 608, the fins 610 should grip the nuggets sufficiently tightly that the device 600 will not fall off the wire bundle 620 if the wire bundle 620 is inverted. If the sheath 608 is too loose and the device 600 falls off the wire bundle 620, a sheath 608 having a smaller inner diameter may be needed for use with that particular wire bundle.

The device 600 is then heated to a temperature sufficient to recover the tubing 602 and to cause the sealant 604 to flow, but below a temperature at which the sheath 608 becomes too soft to prevent wire poke-through.

Upon heating, the sheath 608 will preferably soften and deform slightly, to conform to the shape of the exposed wires 622, while maintaining sufficient strength and rigidity to prevent wire poke-through in the event that any of the individual wires extends at an angle which might puncture the softened heat-recoverable exterior tubing 602. The sealant/adhesive 604 melts and flows upon the application of heat, flowing to the interior of the sheath 608, thereby sealing the exposed wires 622 from exterior elements.

Figure 7:
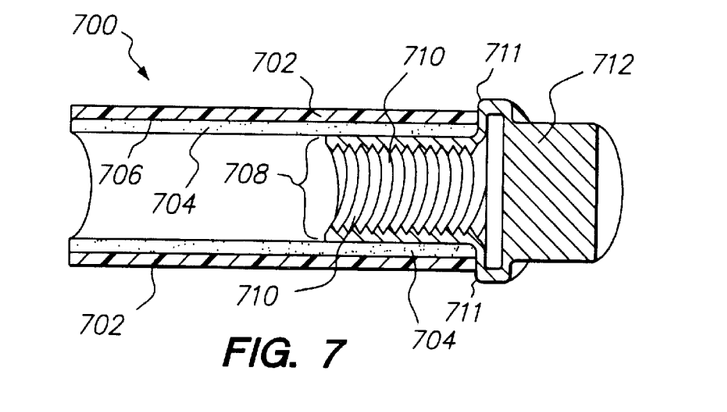
FIG. 7 shows a schematic of a cross-sectional side view of a third embodiment device of the invention, where the cap having the wire-holding configured shape extends from one end of the tubing to form a closure at that end.

FIG. 7 shows a third embodiment of the present invention, wherein the device 700 includes a cap 708 having an end 712 which is easily grasped by automated handling equipment and a rim 711 which mates with heat-recoverable tubing 702. The cap 708 is inserted into heat-recoverable tubing 702. Heat-recoverable tubing 702 may have an adhesive/sealant 704 applied over its entire interior surface as shown in FIG. 7, or may be applied only to the portion of tubing 702 which is not in direct contact with cap 708. Cap 708 is preferably held in place by a friction fit prior to recovery of heat-recoverable tubing 702. Cap 708 includes an interior conformed shape 710, shown here as a coil or spiral shape, which is used to hold inserted wires within cap 708.

Figure 8:
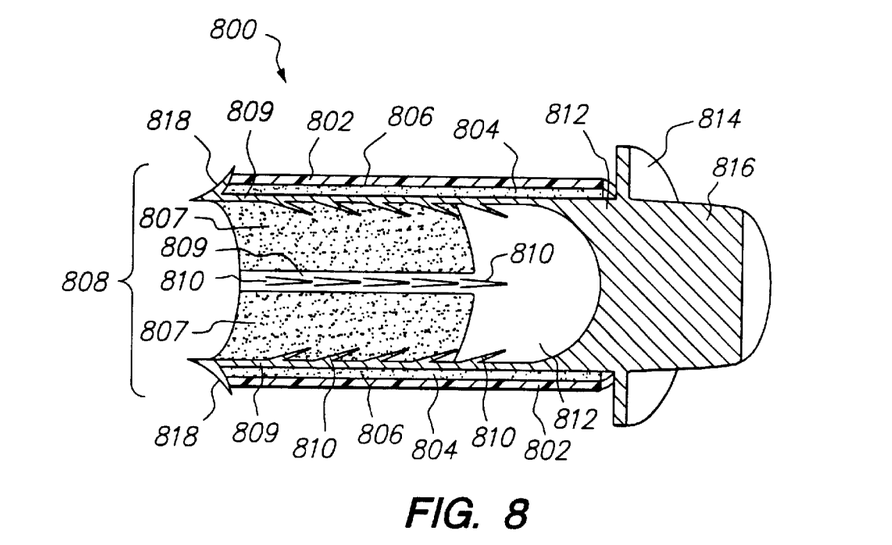
FIG. 8 shows a schematic of a cross-sectional side view of a fourth embodiment device of the invention, where the cap having the wire-holding configured shape extends from one end of the tubing to form a closure at that end, while extending the entire length of the tubing along its interior, to confine the tubing at the open end of the device.

FIG. 8 shows a fourth embodiment of the present invention, wherein the device 800 includes a cap 808 having an end 816 which is easily grasped by automated handling equipment and an rim 814 which mates with heat-recoverable tubing 802 after heat recovery of the tubing (not shown). Cap 808 is inserted into the entire length of heat-recoverable tubing 802 and includes feet 818 which spring back after insertion into tube 802, to prevent tubing 802 from slipping off cap 808 and to hold tubing 802 generally in place. Cap 808 includes a dome section 812 which is designed to provide a high strength area into which the ends of exposed wires can be inserted to reduce the possibility of exposed wire poke through. Cap 808 also includes longitudinal members 809 which extend from dome section 812 to feet 818, with openings 807 between members 809, to permit adhesive/sealant 804 to flow through and to encapsulate wires which are inserted into cap 808. Further, cap 808 includes arms 810 which extend toward the interior of device 800 in a manner such that they act against the withdrawal of inserted wires (not shown).

The device and method of the invention are useful in preventing moisture from reaching exposed, spliced wires, while simultaneously preventing wire poke-through. The device and method of the invention are particularly suitable for use in electrical harnesses within the engines of automobiles and other motor vehicles.

The above described preferred embodiments are not intended to limit the scope of the present invention, as one skilled in the art can, in view of the present disclosure, expand such embodiments to correspond with the subject matter of the invention claimed below.

We claim:

1. A device for protecting and sealing wires having an exposed portion where an electrically insulating covering has been stripped off, wherein the device comprises (a) dimensionally-recoverable tubing, (b) a layer of sealant applied to at least a portion of an interior surface of said tubing, and (c) a cap or sheath into which at least a portion of said exposed portion of said wires are inserted, wherein at least a portion of the cap or sheath is positioned interior to the dimensionally-recoverable tubing, wherein said cap or sheath includes an interior, configured shape affixed thereto for holding said wires inserted therein, wherein said cap or sheath forms a closure at one end of the dimensionally-recoverable tubing or is positioned at or adjacent to a closure end of said tubing, and wherein said cap or sheath includes an exterior, at least the exterior of said cap or sheath is made of a first non-conductive material.

2. The device according to claim 1, wherein said dimensionally-recoverable tubing is heat-recoverable tubing.

3. The device according to claim 2, wherein said tubing and said sealant work in cooperation so that the sealant acquires a viscosity ranging between out 500 and about 5,000 poise at a temperature at which said heat-coverable tubing is recovered.

4. The device according to claim 2, wherein said sealant also functions as adhesive.

5. The device according to claim 4, wherein said adhesive is a single-part adhesive.

6. The device according to claim 4, wherein said adhesive is a thermoplastic adhesive.

7. The device according to claim 2, wherein said device includes a sheath having an exterior, wherein the exterior of said sheath is made of a first non-conductive material, wherein said configured shape is made of said first non-conductive material, and wherein said sheath and said configured shape are molded as an integral unit.

8. The device according to claim 2, wherein said cap includes a longitudinal axis and an interior having a center and wherein said configured shape comprises fins positioned along the longitudinal axis of said cap and extending radially toward the center of said cap.

9. A device according to claim 2, wherein said configured shape comprises an internal coil.

10. The device according to claim 2, wherein said cap forms a closure in combination with said tubing at one end of said tubing, and wherein said cap includes a portion exterior to said tubing which can be easily grasped by automated handling equipment.

11. The device according to claim 10, wherein said configured shape is made of the same non-conducive material as said cap, and wherein said cap and said configured shape are molded as an integral unit.

12. A device according to claim 2, wherein said configured shape comprises at least three fins positioned along the longitudinal axis of said sheath and extending at an angle from a radius of the interior of said sheath, wherein said fins extend toward the center of said sheath.

13. The device according to claim 1, wherein said sealant also functions as adhesive.

14. The device according to claim 1, wherein said cap forms a closure in combination with said tubing at one end of said tubing, and wherein said cap includes a portion exterior to said tubing which can be easily grasped by automated handling equipment.

15. The device according to claim 14, wherein said configured shape is made of said first non-conductive material, and wherein said cap and configured shape are molded or shaped as an integral part.

16. The device according to claim 15, wherein said device includes a cap, and wherein said configured shape includes arms which extend toward the cap interior in a manner which acts against the removal of wires inserted into said device.

17. The device according to claim 1, wherein said device includes a sheath having an exterior, wherein the exterior of said sheath is made of a first non-conductive material, wherein said configured shape is made of said first non-conductive material, and wherein said sheath and said configured shape are molded as an integral unit.

18. The device according to claim 1, wherein said cap includes a longitudinal axis and an interior having a center wherein said configured shape comprises fins positioned along the longitudinal axis of said cap and extending radially toward the center of said cap.

19. The device according to claim 1, wherein said cap includes a longitudinal axis and an interior having a center and wherein said configured shape comprises at least three fins positioned along the longitudinal axis of said cap and extending at an angle from a radius of the interior of said cap, wherein said fins extend toward the center of said cap.

20. A device according to claim 1, wherein said configured shape comprises an internal coil.

21. A cap or sheath for use in a device according to claim 1, wherein said cap or sheath includes a configured shape for holding wires, wherein said configured shape permits a fluid sealant or adhesive located exterior to said configured shape to reach the wires inserted therein, and wherein said cap or sheath has sufficient strength to prevent wire poke through during recovery of a heat-coverable device with which the cap or sheath is used.

22. The cap or sheath according to claim 21, wherein said dimensionally-recoverable tubing is heat recoverable at a heat-recoverable temperature and wherein an exterior of said cap or sheath is made of a non-conductive material having a softening temperature which is higher than the heat-recoverable temperature of said device.

23. The cap or sheath according to claim 21, wherein said configured shape is made of said first non-conducive material, and wherein said configured shape is molded simultaneously with said cap or sheath into an integral unit.

24. The cap or sheath according to claim 21, wherein said configured shape comprises at least three fins arranged along the longitudinal axis of said cap or said sheath and extending at an angle from a radius of said cap or said sheath, toward the center of said cap or said sheath.

25. The cap or sheath according to claim 21, wherein said configured shape comprises at least three fins arranged along the longitudinal axis of said cap or said sheath and extending toward the center of said cap or sheath.

26. The cap or sheath according to claim 25, wherein said configured shape comprises an internal coil.

27. A cap or sheath according to claim 25, wherein said configured shape includes a longitudinal centerline and wherein said configured shape includes arms which extend toward its longitudinal centerline and which resist removal of wires inserted into said configured shape.

28. A method for protecting and sealing wires having an exposed portion where an electrically insulating covering has been stripped off, said method comprising:

(a) inserting wires including an exposed, non-insulated portion into a device comprising (i) a heat-recoverable tubing, (ii) a layer of sealant applied to at least a portion of the interior surface of said tubing, and (iii) a cap or sheath into which at least a portion of said exposed portion of said wires are inserted, wherein at least a portion of the cap or sheath is positioned interior to the dimensionally-recoverable tubing, wherein said cap or sheath includes an interior, configured shape affixed thereto for holding said inserted wires, wherein said cap or sheath forms a closure at one end of the heat recoverable tubing or is positioned at or adjacent to a closure end of said heat recoverable tubing, and wherein at least the exterior of said cap or sheath is made of a non-conductive material; and (b) heating said device to a temperature sufficient to recover said tubing and to cause said sealant to acquire a viscosity ranging from about 500 to about 5,000 poise for a time sufficient to permit said sealant to flow around said exposed wires and a junction of said wires and said electrically insulating covering.

29. The method of claim 28, wherein said sealant acts as an adhesive.

30. The method of claim 29, wherein said cap or said sheath softens upon heating and conforms to the shape of said wires.

31. The method of claim 28, wherein said cap or said sheath softens upon heating and conforms to a shape of said wires.

* * * * *